No. 617,715. Patented Jan. 17, 1899.
W. M. BROWN.
INCLOSED ELECTRIC SWITCH.
(Application filed Sept. 11, 1897.)
(No Model.)

WITNESSES:

INVENTOR
W. Milt Brown
BY Richard Eyr
ATTORNEY.

UNITED STATES PATENT OFFICE.

WILLIAM MILTON BROWN, OF JOHNSTOWN, PENNSYLVANIA.

INCLOSED ELECTRIC SWITCH.

SPECIFICATION forming part of Letters Patent No. 617,715, dated January 17, 1899.

Application filed September 11, 1897. Serial No. 651,315. (No model.)

*To all whom it may concern:*

Be it known that I, WILLIAM MILTON BROWN, of Johnstown, Cambria county, Pennsylvania, have invented a certain new and useful Inclosed Electric Switch, of which the following is a specification.

My invention relates to a switch for lead-covered electric cables of the type used to distribute the underground current used by electric railways, electric-lighting systems, or other kindred systems of electrical distribution.

The object of my invention is to provide a small and simple switch which may be permanently secured to the cables at any part of the system, which may be itself as well protected by metal covering as the cables themselves, which may be used to open or shift the circuit from the outside, and which is of such a construction that the switch parts are thoroughly protected from moisture or other leaks.

With these ends in view my invention consists in the provision of insulating members inclosing the switch members and protected by a metal covering which is united with the lead covering of the cable, in the provision of a post having tapered ground bearings in the metal covering of the structure and carrying the movable switch member, and in the novel construction, arrangement, and combination of parts, which I will now fully set forth.

Figure 1:
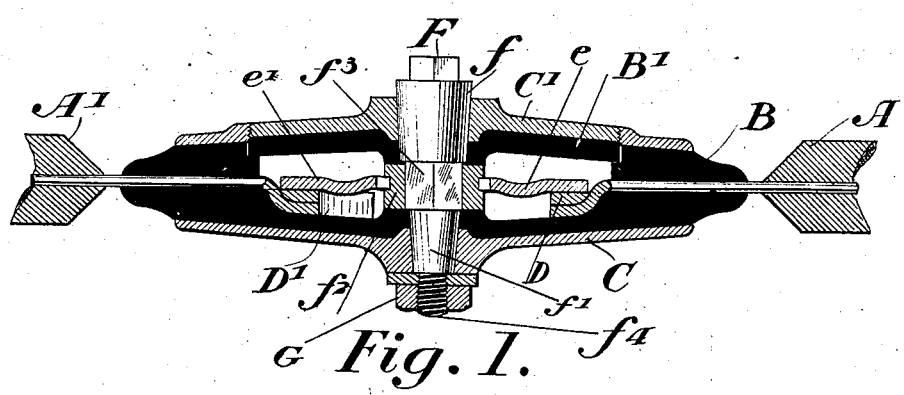
Figure 2:
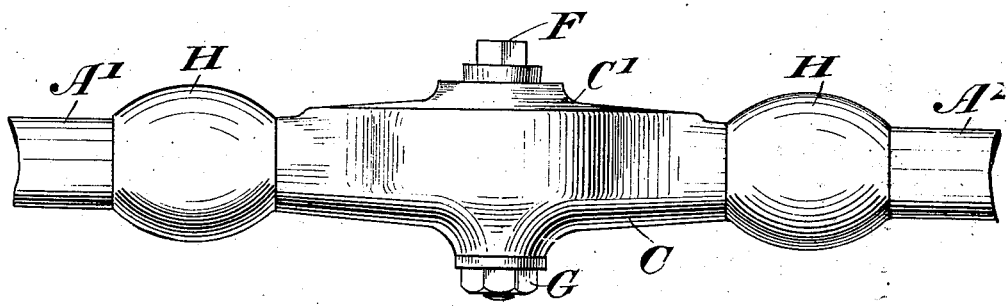
Figure 3:
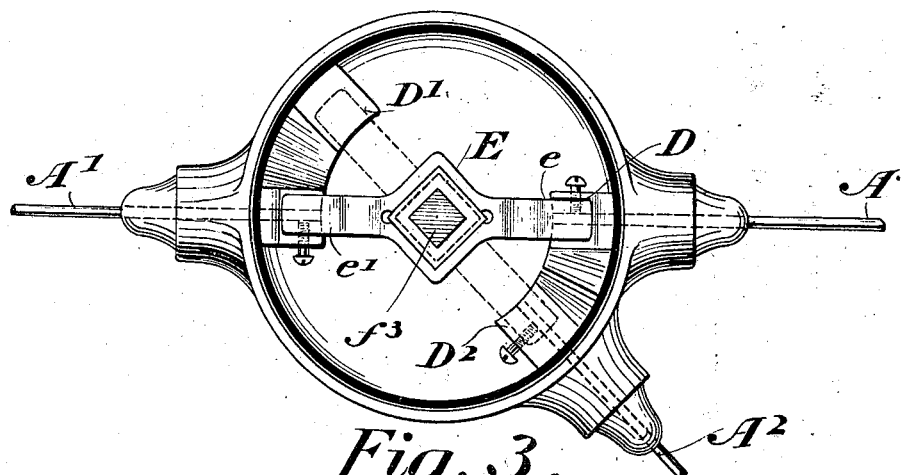

Referring to the drawings, Figures 1, 2, and 3 represent, respectively, sectional, side, and plan views of a switch constructed in accordance with my invention.

A, A', and $A^2$ are metal-covered cables which are bared at their ends and enter the walls of the box. It is clear that instead of passing these cables through the walls of the vessel short sections of conductor might pass through the walls and be coupled outside the vessel to the cables by a sleeve-joint or other desired means.

B is a suitable insulating vessel, preferably of molded mica or similar material, having the cover B', also of similar material. C and C' are metallic covers, preferably of brass, for B and B', respectively.

D, D', and $D^2$ are contact-blocks secured to the floor of the vessel B and connected in any suitable manner to the cables A, A', and $A^2$.

E is a member carrying the switch-blades $e$ and $e'$ and is suitably secured to the revoluble post F. These blades or terminals in their movement engage the blocks D, D', and $D^2$.

The post F is tapered to fit the metallic covers C and C' at $f$ and $f'$, respectively. The joints between $f'$ and C and $f$ and C' should be ground smooth, as with powdered emery, in a manner similar to that used for water-valves of a parallel construction. At the center of the post is carried an insulating-block $f^3$, such as a square porcelain nut. This in turn carries the metallic member $f^2$, to which the switch-blades are secured. The lower end of the post is threaded at $f^4$, so as to be held in place by the nut G.

Fig. 1 shows the structure before its metal covering has been united to the lead covering of the cable. Fig. 2 shows the structure when completed by the wiped joints H, whereby a metallic protection is afforded to all parts of the structure and the vessel and contents are sustained directly by the connecting-cables. It will be noted that the cables A and A' are bared at the end and the lead and insulating cover cut in the usual manner to prepare the cable for a wiped joint. The insulating vessel B also is formed with pointed projections, so that the wiped joints H may connect the vessel to each cable in precisely the same manner as the two ends of similar cables are ordinarily connected.

Of course the particular number of cables entering the structure is immaterial, as it may be used merely to open and close the circuit between two sections of the same cable, or it may be used to shift the circuit among several cables in any desired manner. Of course, also, I am not restricted to the use of lead as a covering for the cables, as the use of another metal suitable for the purpose would not make my invention any the less useful. Neither am I restricted to the other specific details set forth, as those are but illustrative of the nature of my invention.

Having thus described my invention, what I claim, and desire to protect by Letters Patent, is—

1. The combination of a pair of metal-covered cables, a switch connected to the cables and contained in a closed vessel of insulating material, a metallic casing therefor, a switch-operating member extending through the walls of said vessel and casing and a metal connection between the metal cover of the cable and the casing of the vessel.

2. The combination of a closed insulating vessel and a metal casing for the same, tapered passages in the opposite walls of the vessel and casing, a post passing through said vessel and fitting in said bearings, and a switch member carried by the central portion of said post.

3. The combination of the closed vessel having a tapered passage in the top wall and another in the bottom wall thereof, a revoluble post having tapered portions bearing in said passages, an insulating member carried by the central portion of said post, and a switch-blade carried by said insulating member.

4. The combination of the vessel and cover, the metal casing for the same, the terminals D and D' within said vessel, the tapered passages in the walls of said vessel, cover and casing, the revoluble post fitting in said tapered passages, and the switch-blade carried by a central portion of said post and adapted to contact with said terminals.

In testimony whereof I have affixed my signature in presence of two witnesses.

WILLIAM MILTON BROWN.

Witnesses:
ERNEST G. THOMPSON,
J. WALTER THOMPSON.